United States Patent
Yang et al.

(10) Patent No.: US 11,688,081 B2
(45) Date of Patent: Jun. 27, 2023

(54) METHOD OF PERFORMING SIMULTANEOUS LOCALIZATION AND MAPPING WITH RESPECT TO A SALIENT OBJECT IN AN IMAGE

(71) Applicant: LG ELECTRONICS INC., Seoul (KR)

(72) Inventors: Sookhyun Yang, Seoul (KR); Gyuho Eoh, Seoul (KR); Jungsik Kim, Seoul (KR); Minjung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 181 days.

(21) Appl. No.: 16/855,979

(22) Filed: Apr. 22, 2020

(65) Prior Publication Data

US 2021/0073570 A1    Mar. 11, 2021

(30) Foreign Application Priority Data

Sep. 6, 2019   (KR) ........................ 10-2019-0111013

(51) Int. Cl.
*G06V 10/46*     (2022.01)
*B25J 13/08*     (2006.01)
(Continued)

(52) U.S. Cl.
CPC .......... *G06V 10/462* (2022.01); *B25J 9/1664* (2013.01); *B25J 13/006* (2013.01); *B25J 13/089* (2013.01);
(Continued)

(58) Field of Classification Search
CPC .... G06K 9/78; G06K 9/00664; G06K 9/6201; G06K 9/64
See application file for complete search history.

(56) References Cited

U.S. PATENT DOCUMENTS 10,769,440 B1 * 9/2020 Zhang ................. G01C 21/206
2004/0208372 A1 * 10/2004 Boncyk ............. H04N 1/00005
707/E17.023

(Continued)

OTHER PUBLICATIONS

Frintrop et al., "Attentional Landmarks and Active Gaze Control for Visual SLAM", 2008, IEEE Transactions on Robotics, vol. 24, No. 5, Oct. 2008, pp. 1054-1065.*

(Continued)

*Primary Examiner* — Guillermo M Rivera-Martinez
(74) *Attorney, Agent, or Firm* — Lee Hong Degerman Kang & Waimey

(57) ABSTRACT

The present disclosure relates to a method for performing simultaneous localization and mapping (SLAM) with respect to a salient object in an image, a robot and a cloud server for implementing such method. According to an embodiment of the present disclosure, a robot includes a camera sensor configured to capture one or more images for the robot to perform the SLAM with respect to a salient object for estimating a location of the robot within the space, a map storage configured to store the information for the robot to perform the SLAM, and a controller that is configured to: detect an object from the captured image; select, as a specific salient object for identifying the space, the detected object verified as corresponding to the specific salient object; and store, in the map storage, the selected specific salient object and coordinate information related to the selected specific salient object.

19 Claims, 12 Drawing Sheets

(51) Int. Cl.
*B25J 13/00* (2006.01)
*B25J 9/16* (2006.01)
*G06T 7/579* (2017.01)
*G01B 11/14* (2006.01)
*G06F 16/53* (2019.01)
*G05D 1/02* (2020.01)
*G06V 20/10* (2022.01)

(52) U.S. Cl.
CPC .......... *G01B 11/14* (2013.01); *G05D 1/0274* (2013.01); *G06F 16/53* (2019.01); *G06T 7/579* (2017.01); *G06V 20/10* (2022.01); *G06T 2207/20164* (2013.01); *G06T 2210/12* (2013.01)

(56) References Cited

U.S. PATENT DOCUMENTS

| | | | |
|---|---|---|---|
| 2009/0234499 A1* | 9/2009 | Nielsen | B25J 9/161 700/250 |
| 2012/0306847 A1* | 12/2012 | Lim | G06T 7/579 345/418 |
| 2015/0212521 A1* | 7/2015 | Pack | G05D 1/0214 701/28 |
| 2016/0005229 A1* | 1/2016 | Lee | G06T 11/60 345/419 |
| 2016/0154408 A1* | 6/2016 | Eade | G06F 16/444 701/523 |
| 2016/0196659 A1* | 7/2016 | Vrcelj | G06K 9/6215 382/154 |
| 2016/0375592 A1* | 12/2016 | Szatmary | G06V 20/58 700/250 |
| 2017/0123425 A1* | 5/2017 | Zhao | B64D 47/08 |
| 2018/0137642 A1* | 5/2018 | Malisiewicz | G06T 7/11 |
| 2018/0161986 A1* | 6/2018 | Kee | G06V 20/10 |
| 2019/0026956 A1* | 1/2019 | Gausebeck | G06T 7/521 |
| 2019/0101919 A1* | 4/2019 | Kobilarov | G05D 1/0274 |
| 2019/0130630 A1* | 5/2019 | Ackerson | G06T 9/001 |
| 2019/0147220 A1* | 5/2019 | McCormac | G06K 9/6277 382/103 |
| 2019/0213438 A1* | 7/2019 | Jones | G06T 7/74 |
| 2019/0217476 A1* | 7/2019 | Jiang | B25J 9/1697 |
| 2019/0219401 A1* | 7/2019 | Daniilidis | G01C 21/165 |
| 2020/0300637 A1* | 9/2020 | Chiu | G05D 1/027 |

OTHER PUBLICATIONS

Lee at al., "Efficient Visual Salient Object Landmark Extraction and Recognition", 2011, Pohang University of Science and Technology (POSTECH), pp. 1351-1357.*
Newman et al., "SLAM-Loop Closing with Visually Salient Features", 2005, Proceedings of the 2005 IEEE International Conference on Robotics and Automation Barcelona, Spain, Apr. 2005, pp. 635-642.*
Bewley et al., "Simple Online and Realtime Tracking," Queensland University of Technology, University of Sidney, Jul. 2017, 5 pages.
Yu et al., "POI: Multiple Object Tracking with High Performance Detection and Appearance Feature," Beihang University, China, University at Albany, SUNY, USA, Sensetime Group Limited, China, Oct. 2016, 7 pages.

* cited by examiner

METHOD OF PERFORMING SIMULTANEOUS LOCALIZATION AND MAPPING WITH RESPECT TO A SALIENT OBJECT IN AN IMAGE

CROSS-REFERENCE TO RELATED APPLICATION

Pursuant to 35 U.S.C. § 119(a), this application claims the benefit of earlier filing date and right of priority to Korean Patent Application No. 10-2019-0111013, filed on Sep. 6, 2019, the contents of which are hereby incorporated by reference herein in its entirety.

BACKGROUND

1. Field of the Invention

The present disclosure relates to a method for performing simultaneous localization and mapping (SLAM) with respect to a salient object in an image, and a robot and a cloud server implementing such method.

2. Description of Related Art

Robots may be disposed and may move in indoor spaces or outdoor spaces to provide people with information or to provide convenience to people in spaces where human and material resources are actively exchanged, such as large markets, department stores, airports, and golf courses. In some examples, the robots may have a shape of a vehicle and may move outdoors by travelling on a sidewalk. The robots may perform functions such as delivery, security, cleaning, and guidance.

In order for the robots to perform autonomous driving without control from people or to perform semi-autonomous driving under a temporary control of people, these robots are required to check a current position of the robot and store or receive information required for the robot to move to a destination of the robot while avoiding obstacles disclosed around the robot.

To this end, the robot may store map information and may receive map information from a server or another adjacent robot in real time.

In this process, it is required to compare information acquired on the current position of the robot with map information in order for the robot to accurately identify the current position of the robot. To this end, the map information may include precise information on the space. In some examples, the map information is required to include information that is easy to search.

Thus, the present disclosure proposes a method for generating a map suitable for performing simultaneous localization and mapping (SLAM) by a robot.

SUMMARY OF THE INVENTION

In the present disclosure, to solve the above-described problem, a robot or a cloud server may store image information and salient objects for estimating a location by generating, by the robot, a map.

In some examples, in the present disclosure, a salient object suitable for improving accuracy in and speed of location estimation is extracted from an image.

In some examples, according to the present disclosure, a position of a salient object in an image is stored with the salient object such that the robot may accurately estimates a position or location using the position of the salient object.

The objects of the present disclosure are not limited to the above-mentioned objects, and the other objects and advantages of the present disclosure, which are not mentioned, can be understood by the following description, and more clearly understood by the embodiments of the present disclosure. It is also readily understood that the objects and the advantages of the present disclosure may be implemented by features described in appended claims and a combination thereof.

According to an embodiment of the present disclosure, a robot performing simultaneous localization and mapping (SLAM) with respect to a salient object from an image may include a motor configured to cause the robot to move within a space; a camera sensor configured to capture one or more images for the robot to perform simultaneous localization and mapping (SLAM) with respect to a salient object for estimating a location of the robot within the space; a map storage configured to store information for the robot to perform the SLAM; and a controller configured to detect an object from the captured image; select, as a specific salient object for identifying the space, the detected object verified as corresponding to the specific salient object; and store, in the map storage, the selected specific salient object and coordinate information related to the selected specific salient object.

According to an embodiment of the present disclosure, the robot performing the SLAM with respect to the salient object in the image may input a specific object from the captured image as a search query for performing a position estimation of the robot, wherein the specific object is inputted based at least in part on the stored selected specific salient object from the map storage According to an embodiment of the present disclosure, the robot performing the SLAM with respect to the salient object in the image may determine a distance between the object from the robot, and to determine a suitability of the detected object with respect to the selected specific salient object based on an arrangement sequence of one or more objects, wherein the detected object is selected based at least in part on the detected object being determined as the fixed object and a respective distance of the detected object being determined to be less than a predefined threshold.

According to an embodiment of the present disclosure, the robot performing the SLAM with respect to the salient object in the image may determine a similarity based on a comparison between the detected object and a particular object stored in a database or a previously selected salient object, and to determine a suitability of the detected object with respect to the selected specific salient object based at least in part on the determined similarity.

According to an embodiment of the present disclosure, the detected object may be verified as corresponding to the specific salient object based at least in part on an object being included in both a first image obtained at a first time point and a second image obtained at a second time point subsequent to the first time point According to an embodiment of the present disclosure, the detected object may be verified as corresponding to the specific salient object based at least in part on a position change of the object between respective positions of the object in the first image and the second image, and a moving distance of the robot.

According to an embodiment of the present disclosure, the coordinate information may comprise information on a position and a size of a bounding box around the selected specific salient object.

According to an embodiment of the present disclosure, a cloud server, may comprise a communicator configured to receive, from a robot, one or more images for the robot to perform simultaneous localization and mapping (SLAM) with respect to a salient object for estimating a location of the robot within a space; a map storage configured to store information for the robot to perform the SLAM; and a server controller configured to detect an object from the received one or more images; select, as a specific salient object for identifying the space, a detected object verified as corresponding to the specific salient object; and store, in the map storage, the selected specific salient object and coordinate information related to the selected specific salient object.

According to an embodiment of the present disclosure, a method for performing SLAM with respect to a salient object in an image may include causing a robot to move within a space; capturing, by a camera sensor of the robot, one or more image for performing a simultaneous localization and mapping (SLAM) with respect to a salient object for estimating a location of the robot within the space; detecting an object from the captured image; selecting, as a specific salient object for identifying the space, a detected object verified as corresponding to the specific salient object; and storing the selected specific salient object and coordinate information related to the selected specific salient object.

When embodiments of the present disclosure are applied, the robot or the cloud server may store image information and salient objects for estimating location for localization by generating a map.

In some examples, when embodiments of the present disclosure are applied, the robot or the cloud server may extract a salient object in the image, which is suitable for improving accuracy and increasing speed in estimation of location, and may verify whether the object is the salient object.

In some examples, when embodiments of the present disclosure are applied, the position of the salient object in the image may be stored together such that the robot can accurately estimate the location or position of the robot using the position of the salient object.

The effect of the present disclosure is not limited to the above-mentioned effect, and those skilled in the art of the present disclosure may easily understand various effects of the present disclosure based on the disclosure of the present disclosure.

DETAILED DESCRIPTION OF EXEMPLARY EMBODIMENTS

Figure 1:
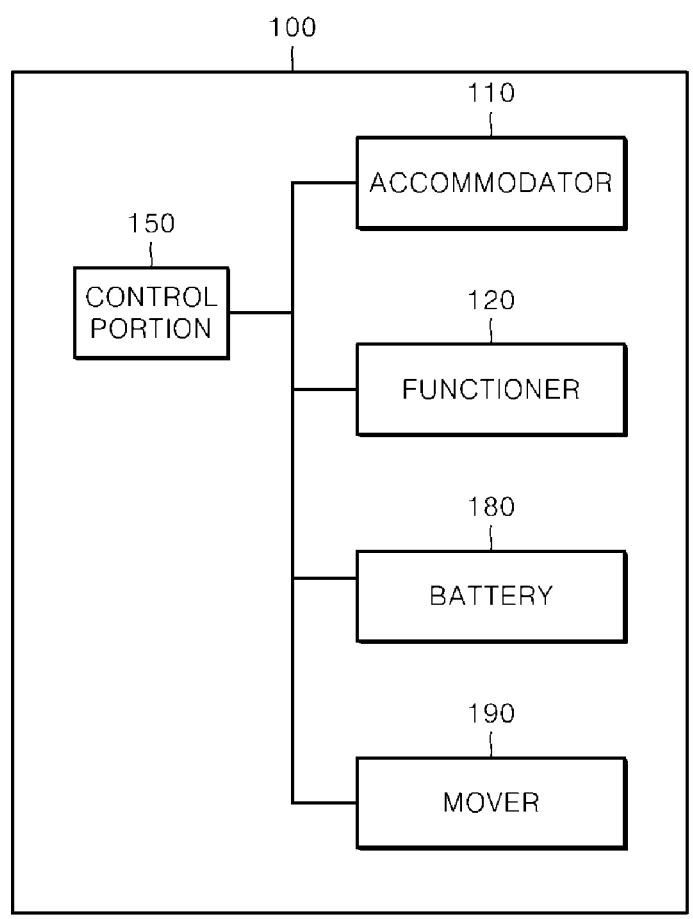
FIG. 1 shows a configuration of a robot that generates a map.

Embodiments of the present disclosure are described below in detail with reference to the drawings so that those skilled in the art to which the present disclosure pertains may easily implement the present disclosure. The present disclosure may be implemented in many different manners and is not limited to the embodiments described herein.

In order to clearly illustrate the present disclosure, technical explanations that are not directly related to the present disclosure may be omitted, and same or similar components are denoted by a same reference numeral throughout the disclosure. Further, some embodiments of the present disclosure are described in detail with reference to the exemplary drawings. In adding reference numerals to components of each drawing, the same components may have the same reference numeral as possible even if they are displayed on different drawings. Further, in describing the present disclosure, a detailed description of related known configurations and functions is omitted when it is determined that it may obscure the gist of the present disclosure.

In describing components of the present disclosure, it is possible to use terms such as first, second, A, B, (a), and (b), and the like. These terms are only intended to distinguish a component from another component, and a nature, an order, a sequence, or a number of the corresponding components are not limited by that term. When a component is described as being "connected", "coupled", or "connected" to another component, the component may be directly connected or able to be connected to the other component; however, it is also to be understood that an additional component may be "interposed" between the two components, or the two components may be "connected", "coupled" or "connected" through an additional component.

Further, with respect to embodiment of the present disclosure, the present disclosure may be described by subdividing an individual component, but the components of the present disclosure may be implemented within a device or a module, or a component of the present disclosure may be implemented by being divided into a plurality of devices or modules.

Hereinafter, in the present disclosure, the robot includes devices having various shapes, and that have specific purposes (delivery, cleaning, security, monitoring, guidance, and the like) or move and provide functions according to properties of spaces where the robot moves. Therefore, according to the present disclosure, the robot collectively refers to a device that includes wheels that move the robot based on predetermined information and using a sensor and provides a predetermined function.

In the present disclosure, the robot with a stored map may move. The stored map refers to information on fixed objects such as images of streets, fixed walls, buildings, and stairs that do not move in space. In some examples, information on moving obstacles that are disposed periodically (e.g., dynamic objects) may further be stored in the map.

In the present disclosure, a robot may generate a map. However, the robot that generates the map and the robot with the map that moves may not necessarily include the same components. The robot that generates the map includes a first group of components suitable for generating the map, and the robot moving using the map includes a second group of components suitable for moving the robot using the map. In some examples, the components of the first group and the components of the second group may not be necessarily identical to each other.

In the present disclosure, the robot transmits and receives information through communication with a cloud server, and may transmit and receive map information in this process. Alternatively, the cloud server transmits, to the robot, map information within a predetermined range including the area where the robot is disposed, and the robot may perform simultaneous localization and mapping (SLAM) based on the map information.

The robot may use a Light Detection and Ranging (LiDAR) sensor that identifies positions of objects or a camera sensor that captures an image for performing SLAM. In particular, when the robot travels in large spaces such outdoor spaces, the robot may store, in the map, image information related to the space. In this case, the image information stored in the map is not a simple image but includes information on salient portions in the image.

Therefore, the robot may automatically select the salient portions and automatically register the portions on the map during map generation to increase the speed or improve accuracy in estimation of the location thereof. Alternatively, the robot may provide users with candidate information related to the salient portions so that the user may select the salient portion among the candidates and may register the salient portions on the map.

In an embodiment of the present disclosure, a camera sensor is disposed in the robot to capture an image for performing SLAM. A process of storing, by the robot, information on the salient object in the image during generation of the map using the camera sensor is described. The salient object corresponds to information used for identifying spaces, and examples of the salient object may include signs or signboards. The salient object may be a feature in the image.

In some examples, the robot may extract, from accumulated images, salient objects suitable for SLAM. In some examples, the robot may extract, from the image, a salient object that may be easily distinguished from the accumulated images through artificial intelligence (AI).

FIG. 1 shows a configuration of a robot that generates a map. The robot moves within a space, captures an image using a camera sensor, extracts a salient object from the captured image, and stores the salient object in the map. FIG. 1 shows a configuration of a map generating robot.

A configuration of FIG. 1 corresponds to a map generating robot referred to as "a map generating device" or "a mapper device" for short. The map generation robot is not limited to a robot that defines specific appearance, and includes all types of devices that move in spaces, captures images of the space, store a captured image, and extract a salient object from the captured image.

In the present disclosure, the object identified in the image is described with respect to the salient object. However, the present disclosure is not limited thereto. The robot may set a specific area as a salient object based on LiDAR sensing data generated by a three-dimensional LiDAR sensor or a two-dimensional LiDAR sensor.

The robot 100 may further include a controller 150. The controller 150 controls the robot 100 as if it is a kind of computer or processor. Accordingly, the controller 150 may be disposed in the robot 100 to perform a similar function to a main processor and may be in charge of interacting with a user. In some examples, the controller 150 is in charge of communicating with a cloud server.

The controller 150 is disposed in the robot 100 to detect the robot's movement and nearby objects and to control the robot. The controller 150 may be implemented as software or a chip implemented in hardware.

As shown in FIG. 1, the robot 100 includes a controller 150, an accommodator 110, a primary function unit 120, a battery 180, and a moving unit 190. The robot in FIG. 1 may be classified into industrial robots, medical robots, household robots, military robots, and the like, according to purposes or fields of use.

The robot 100 optionally includes the accommodator 110. The accommodator 110 defines a space where objects are accommodated or stacked by a user. In some examples, the robot may include the accommodator 110 and may move while following users.

The primary function unit 120 performs a predetermined function assigned to the robot. The primary function unit 120 of a robot that performs a cleaning function may include a damp cloth and a suctioner for cleaning. A primary function unit 120 of a robot for delivery may include an accommodation space and a transporter that moves accommodated luggage. A primary function unit 120 of a robot for security may include a tester (air quality inspection, explosives inspection, and the like) for safety functions.

The battery 180 provides electrical energy required for the robot 100 to operate. The moving unit 190 provides a moving function of the robot.

The robot may include a moving unit 190 including an actuator or a motor to perform various kinds of physical operation such as moving joints of a robot. In some examples, the movable robot includes a mover and the mover includes wheels, a brake, a propeller, and the like, and may travel on the ground or fly in the air through the moving unit.

The robot may further perform autonomous driving. Autonomous driving refers to self-driving technology, and the autonomous robot travels without manipulation from users or with a minimum level of manipulation from users.

For example, autonomous driving may include technology for maintaining a predetermined distance with an obstacle in a space where the robot travels, technology for automatically adjusting speed of the robot such as adaptive cruise control, technology for automatically driving along a predetermined path of the robot, and technology for automatically setting a path of a robot based on set destination of a robot to travel.

The robot may include an internal combustion engine or an electric motor for autonomous driving and the internal combustion engine and the electric motor are sub-components of the moving unit 190.

Figure 2:
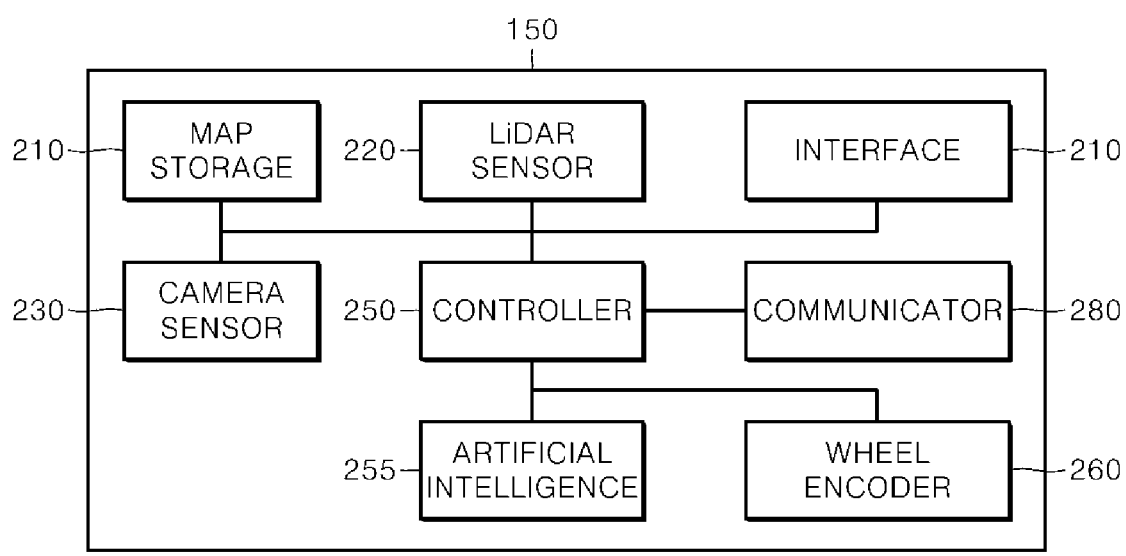
FIG. 2 shows an exemplary configuration of a controller according to an embodiment.

FIG. 2 shows an exemplary configuration of a control portion in detail according to an embodiment.

Components of a controller 150 are logical components of the controller 150 regardless of physical positions or coupling method of components of the controller 150.

The controller 150 controls the robot to perform a function for both generating a map and a function for estimating the robot's location using the map.

Alternatively, the controller 150 may control the robot to provide the function of generating the map.

Alternatively, the controller 150 may control the robot to provide the function for estimating the robot's location using the map. That is, the controller 150 may control the robot to generate the map, estimate the location of the robot using the generated map, or perform both of the two functions.

The robot may transmit, to a cloud server, information acquired by sensors during movement of the robot. The types of sensors are described below.

A LiDAR sensor 220 may sense nearby objects in two dimensions or in three dimensions. The two-dimensional (2D) LiDAR sensor may sense the location of an object in a range of 360 degrees or less with respect to the robot. LiDAR information obtained through the sensing at a specific location is an example of sensor data.

Alternatively, the sensor data obtained by the LiDAR sensor 220 may be referred to as a LiDAR frame. That is, the LiDAR sensor 220 senses a distance between a robot and an external object outside the robot to generate the LiDAR frame.

In some embodiments, a camera sensor 230 is an image sensor. Two or more camera sensors 230 may be used to overcome limitations due to viewing angles of individual cameras. Images captured at a specified location are used to form image information. That is, in some embodiments, image information generated by photographing, by the camera sensor 230, an external object disposed outside the robot is an example of sensor data.

Alternatively, the sensor data obtained by the camera sensor 230 may be referred to as a visual frame. That is, the camera sensor 230 captures the outside of the robot and generates the visual frame.

According to the present disclosure, the robot 100 performs SLAM using at least the LiDAR sensor 220 or the camera sensor 230.

During the SLAM process, the robot 100 may perform map generation or location estimation using the LiDAR frame and the visual frame independently or in combination.

An interface 290 receives information from a user. The interface 290 receives, from a user, various pieces of information such as a touch input and a voice input and outputs a corresponding result. In some examples, the interface 290 may output a map stored in the robot 100 or may output a robot moving route overlapped with the map.

In some examples, the interface 290 may provide predetermined information to the user.

A controller 250 generates a map, which is described in more detail below, and estimates the location of the robot in the robot moving route based on the map. Alternatively, the controller 250 may transmit or receive information in communication with the cloud server and may generate a map or estimate the location of the robot based on the transmitted or received information.

A communicator 280 may enable the robot 100 to transmit or receive information in communication with another robot or an external cloud server.

The map storage 210 stores a map of the space where the robot moves in. In particular, some embodiments, the robot may generate the map by itself. Further, in some embodiments, the map is a stored or saved map by robot, and the robot is synchronized with the cloud server. The map storage 210 may be selectively held by the robot. For example, the robot 100 may use a map stored in the cloud server instead of storing a map.

A wheel encoder 260 collects information on the rotation, direction, and the like of a wheel of the mover of the robot, generates wheel odometry information, and provides the wheel odometry information to the controller 250. The controller 250 may calculate a moving distance or a moving direction of the robot based on the information provided by the wheel encoder 260.

An artificial intelligence processor, or for short, artificial intelligence 255 is described below.

The artificial intelligence processor 255 may be implemented as software, or hardware, and the artificial intelligence processor 255 can be subcomponent of other processor, module, or unit.

In some examples, the cloud server may perform some functions of map generation while the robot draws the map. For example, the robot 100 transmits, to the cloud server, data (e.g., the visual frame or the LiDAR frame) acquired by the camera sensor 230 or the LiDAR sensor 220 of the robot, and the cloud server may accumulate and store the data, and subsequently, may generate the map.

That is, the map storage 210 stores information for the robot to perform SLAM. In some examples, the controller 250 of the robot verifies and extracts the salient object from the image captured by the camera sensor 230 and stores, in the map storage 210, the location information obtained from the image, the salient object identified in the image, and coordinate information related to the salient object in the image.

Figure 3:
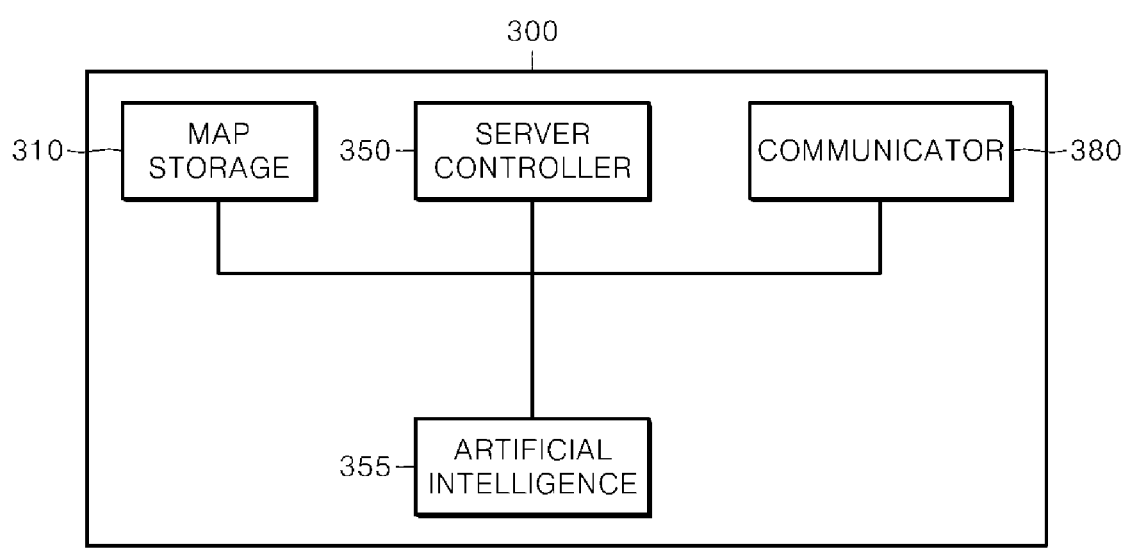
FIG. 3 shows an exemplary configuration of a cloud server according to an embodiment.

FIG. 3 shows an exemplary configuration of a cloud server according some embodiments. A map storage 310 stores a map generated in high quality. The map of the map storage 310 may be partially or entirely transmitted to a robot 100. A communicator 380 communicates with the robot 100. In this process, the communicator 380 may communicate with a plurality of robots 100.

In some examples, an artificial intelligence processor 355 may extract features while generating or updating the map or may match the extracted features to the map or the like. A server controller 350 controls the above-described components, generates various pieces of information for the robot 100 for performing SLAM, and provides the generated information to the robot 100.

The cloud server 300 forms a cloud system. The cloud system includes a plurality of robots and one or more cloud servers 300. The cloud server may process large-capacity/high-performance computation and, thus, may quickly generate a high-quality map by performing the SLAM.

That is, the cloud server 300 may perform SLAM based on as much information as possible with high computing power. As a result, it is possible to significantly improve the quality of the map created by the cloud server 300. When the communicator 380 receives the sensor data transmitted by the robot 100, the server controller 350 may perform feature extraction, map generation, map update, and the like based on the received sensor data. The server controller 350 may recover the location of the robot (kidnap recovery) or provide information for the kidnap recovery if the robot is kidnapped or missing.

The cloud server 300 may also include a map storage 310. The cloud server 300 may include an artificial intelligence processor 355.

The communicator 380 receives, from the robot, an image for performing SLAM. The map storage 310 stores information for the robot to perform SLAM.

The server controller 350 verifies and selects the salient object from the received image and stores, in the map storage 310, the location information obtained from the image, the salient object identified in the image, and coordinate information related to the salient object in the image.

Subsequently, the information stored by the cloud server 300 is transmitted to the robots such that the robots may perform position estimation.

A detailed process of generating a map using the salient object is described below.

The controller 250 of the robot 100 or the server controller 350 of the cloud server 300 identifies a salient object or salient object candidates which are likely to be salient objects based on the obtained sensor data. In some embodiments, the sensor data may be a visual frame which is an image or a LiDAR frame which is a LiDAR sensor data. The image (e.g., the visual frame) obtained by the camera sensor 230 is described in more detail in FIG. 4.

Figure 4:
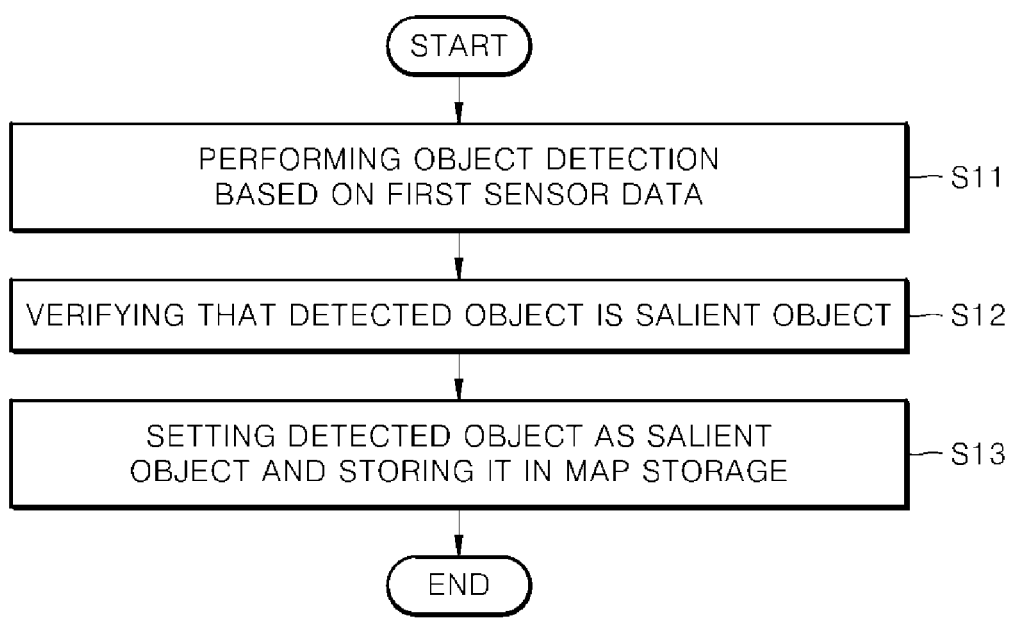
FIG. 4 shows an exemplary process of selecting a salient object according to an embodiment.

FIG. 4 shows an exemplary process of selecting a salient object according to some embodiments. The process may be performed by a controller 150 of a robot 100. The controller 250 of the robot 100 is mainly described, but the server controller 350 of the cloud server 300 may identically perform or provide operation or functions performed by or provided by the controller 250 of the robot 100 during a process in FIG. 4 or in a description below.

The controller 250 of the robot 100 detects an object based on acquired first sensor data (S11). In some embodiments, the camera sensor 230 may acquire an image while the moving unit 190 of the robot 100 moves the robot. In some embodiments, the first sensor data may be or include image data.

For example, the controller 250 detects an object that may have an image feature in the image acquired by the camera sensor. To this end, the controller 250 may refer to respective images of pre-stored objects.

The controller 250 may additionally verify whether the detected object is a salient object (S12). The controller 250 selects the detected object as a salient object and stores the salient object in the map storage 210 (S13).

In this case, the controller 250 may further store coordinate information related to a bounding box to distinguish a periphery of the candidate of the salient object from other portions in the image. The controller 250 may determine whether to include the object as the salient object.

FIG. 4 shows a process of extracting a salient object from an image of a map to increase search speed and to improve accuracy in search during generation of a map. To this end, a controller 250 detects one or more objects in the image (S11) and verifies whether the detected one or more objects correspond to the salient object (S12). The controller 250 stores, in the map storage 210, the object as a salient object based on a result of verifying whether the detected object correspond to the salient object (S13).

When the salient object is stored in the map storage 210, the robot may input a specific object in the image as a search query instead of inputting an entire image photographed during moving of the robot as a search query, in case of performing subsequent position estimation. In this case, a time taken to search for an image may be shortened and accuracy in search may be improved to thereby increase a speed and improve accuracy in the position estimation.

Figure 5:
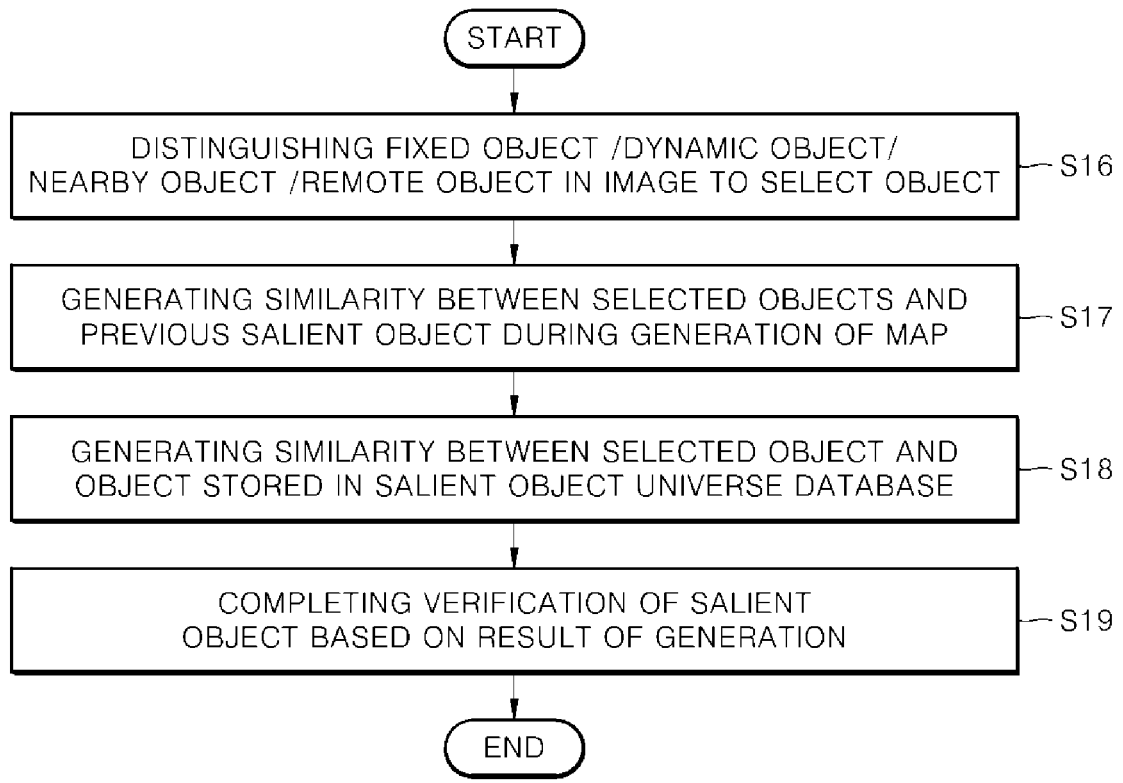
FIG. 5 shows an exemplary process of verifying a salient object according to an embodiment.

FIG. 5 shows an exemplary process of verifying a salient object according to an embodiment. The process in FIG. 5 may be performed by a controller 250 of a robot 100. The process in FIG. 5 may further be performed by the server controller 350 of the cloud server 300 in the same manner.

The controller 250 distinguishes a fixed object from a dynamic object based on sensor data in an image. Subsequently, an object is selected by distinguishing a nearby object from a remote object (S16). Corresponding scores may be assigned to each of the objects during selection. The controller 250 selects, as salient objects, objects that are likely to be salient objects. Alternatively, the controller 250 may selectively perform S17 to S19 to improve accuracy thereof.

S16 shows that the controller 250 determines whether each of the objects extracted from the image is a dynamic object or a fixed object. In an embodiment, the controller 250 determines only the fixed object as the salient object. The stored image and the salient object will be compared with the image captured during a subsequent movement of the robot and the salient object extracted from the captured image.

Therefore, as the person, cars, and the like that are temporarily staying in the space are dynamic objects, the controller 250 may decide not to select the person and cars as salient objects.

In some examples, the controller 250 determines whether each of the objects extracted from the image is an object disposed close to the robot or an object disposed far away from the robot at S16. The controller 250 determines suitability of objects with respect to the salient object according to an arrangement sequence of one or more objects.

The methods described above improve accuracy of the images based on the salient objects stored in the map. Remote objects may have degraded accuracy in the image. Thus, storing the nearby objects as salient objects is advantageous for subsequent position estimation. Therefore, fixed and nearby objects are selected as salient objects. In some embodiments, a predefined threshold may be set such that objects that are determined to be a distance within the predefined threshold are selected as salient objects.

The controller 250 determines similarity between each of the selected objects and each of previous salient objects (S17). In some examples, the controller 250 generates similarity with the object stored in salient object universal database stored in the map storage 210 (S18). Subsequently, the controller 250 completes verification of the salient object based on the generated result of similarity (S19).

Steps S17 and S18 may be performed independently with respect to step S16. That is, the controller 250 may compare each of the objects detected in the image with each of the objects stored in the database or each of the previously selected salient objects, and the controller 250 may generate a similarity based on the comparison. The controller 250 may determine the suitability between objects and the salient object based on the similarity comparison. The objects may be stored as a salient object based on the similarity between each of the objects and each of the salient objects or based on the similarity between each of the objects and each of the stored objects.

Step S17 refers to a process of comparing selected objects with the salient objects previously selected by the controller 250 during generation of the same map. For example, the controller 250 acquires images in a first space, a second space, and a third space during generation of a map, where each space is different from each other. In some examples, the first salient object is set for the image of the first space and the second salient object is set for the image of the second space to store the first salient object and the second salient object in the map storage 210.

The controller 250 selects the third salient object from the image acquired in the third space. The controller 250 compares the first salient object with the third salient object and generates a first similarity. The controller 250 compares the second salient object and the third salient object and generates a second similarity. In some embodiments, the controller 250 may compare the first similarity and the second similarity.

If the first similarity is in the predefined similarity scope or first similarity is high value, it may be determined that the third object is an important salient object. This mechanism can also be applied on the second similarity.

By contrast, if the first similarity or second similarity are out of the predefined similarity scope or the first or second similarity are of a low value, it may be determined that the third object may be identified as a salient object only in the corresponding space.

Therefore, if the first similarity is in the predefined similarity scope or the first similarity is of a high value, the controller 250 selects additional salient object (i.e., a fourth salient object) in the image of the third space for distinguishing a difference between the first space and the third space, and stores the third salient object and the fourth salient object in the map storage 210. This mechanism can also be applied on the second similarity.

In some examples, if the first similarity is out of the predefined similarity scope or the first similarity is of a low value, the controller 250 may store, in the map storage 210, the third salient object as a salient object capable of distinguishing the first space or another space from the third space. This mechanism can be also applied on the second similarity.

In some examples, the controller 250 may compare the object stored in the database to store the salient object (i.e., the salient object universal database) with the third salient object at S18. The salient object universe database is a database to store images of objects that may have image features in a space for generating a map or a similar kind of space.

For example, if a space where the map may be generated is a city, the salient object universal database may store an image feature of specific signs to perform SLAM in the city. For example, the salient object universal database may store images of signs of coffee shops, department stores, and the like, a large number of which are distributed in the city, or images of public telephone booths, or sign images of convenience stores.

The controller 250 generates a similarity between the object in the stored image and the salient object in the currently photographed image. The salient object in the image is determined to be verified if the generated similarity is of a high value or in the predefined scope.

When the verification of the salient object is completed based on a result of generation, the salient object in the corresponding image is stored in the map storage 210 based on the verification result (S19).

In some examples, during the process as shown in FIG. 5, an administrator may select any one of the candidates of the salient object. For example, a method of verifying whether an object detected in an image corresponds to a salient object may be variously performed.

In some embodiments, the controller 250 controls the interface 290 to output an object detected in the image and a bounding box disposed around the object. In some examples, when selection information regarding a specific object or a specific bounding box is input to the interface 290 by the administrator, the controller 250 may set, as the salient object, the selected object or an object included in the selected bounding box.

Alternatively, the controller 250 may exclude dynamic objects (e.g. people, cars, bicycles, animals, and the like) among the objects in the image. By contrast, the controller 250 determines, as the salient objects, the fixed objects (e.g. public telephone box, patterns of outer walls of buildings, signs, and the like) among the objects in the image.

Alternatively, the controller 250 may determine, as the salient object, the nearby object than the remote object in the image.

Figure 6:
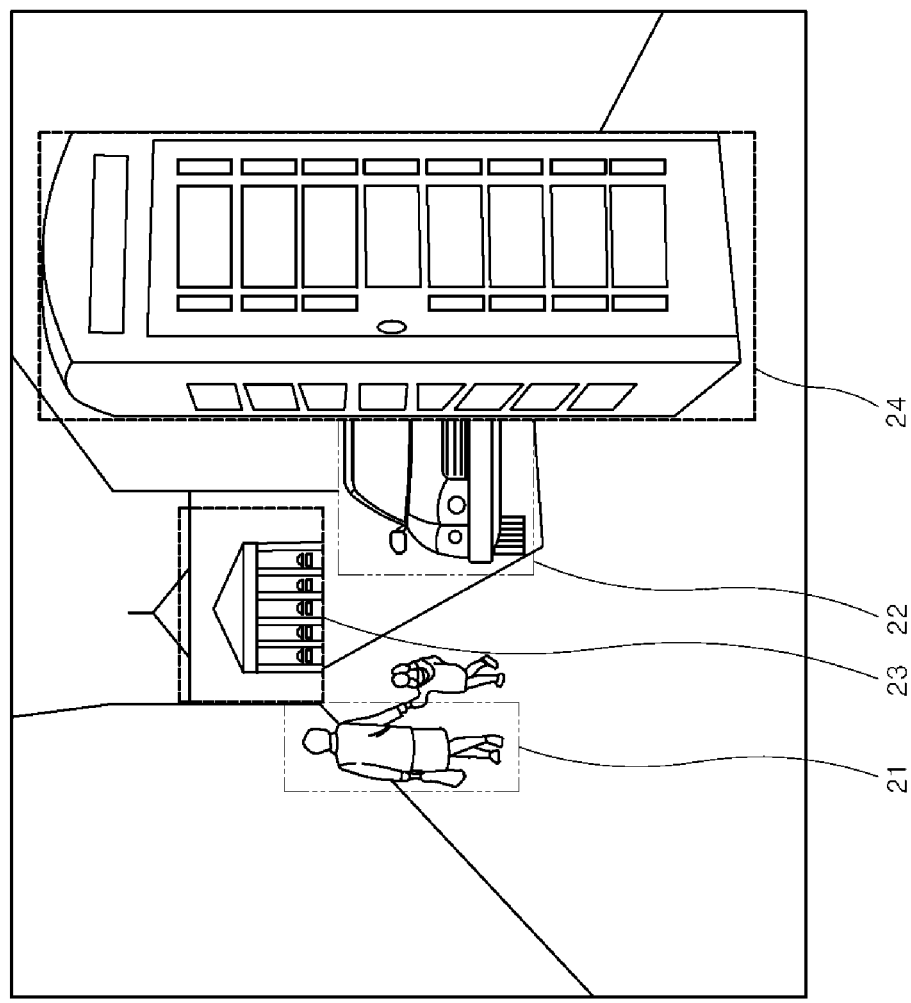
FIG. 6 shows arrangement of a bounding box disposed around a salient object according to an embodiment.

FIG. 6 shows placement of a bounding box disposed around a salient object according to an embodiment. According to the above-described process, a controller 250 selects the salient object in the corresponding image as shown in FIG. 6.

The controller 250 determines areas indicated by reference numerals 21 to 24 as candidates for salient objects.

For each candidate, the controller 250 performs a determination as shown in FIG. 5. As a result, the controller 250 determines reference numeral 21 as a person (in a dynamic area), and reference numeral 22 as a vehicle (in a dynamic area).

In some examples, the controller 250 determines that reference numeral 24 is an adjacent object and a public telephone booth and reference numeral 23 is a remote object and appearance of the building. As a result, the controller 250 determines reference numeral 24 which is a nearby and static object as the salient object among candidates (e.g., reference numerals 21 to 24) of the salient objects. A bounding box may be set to include a boundary line of the public telephone booth.

The controller 250 may store the bounding box and the corresponding image as one image or separately store the bounding box and the corresponding image. The bounding box may be determined based on coordinate values in the image. Accordingly, the controller 250 may store an image and separately store coordinate values of the bounding box.

During the process of searching for, in the map storage, the salient objects in the image acquired by the robot for estimating a position of the robot and comparing the salient objects in the image acquired by the robot during position estimation with the salient object in the map storage, the bounding box is used to determine the image stored in the map and the position of the salient object stored in the map. Accordingly, the map storage may store coordinate information indicating the position and the size of the bounding box of the salient object in the image.

For example, the map storage 210 may store upper left coordinates and lower right coordinates of the bounding box in the image. Alternatively, the map storage 210 may store upper left coordinates (or specific vertex coordinates such as lower right coordinates) and width/height information of the bounding box in the image.

The robot may determine the salient object in one image, but may determine the salient object among two or more consecutive images.

Figure 7:
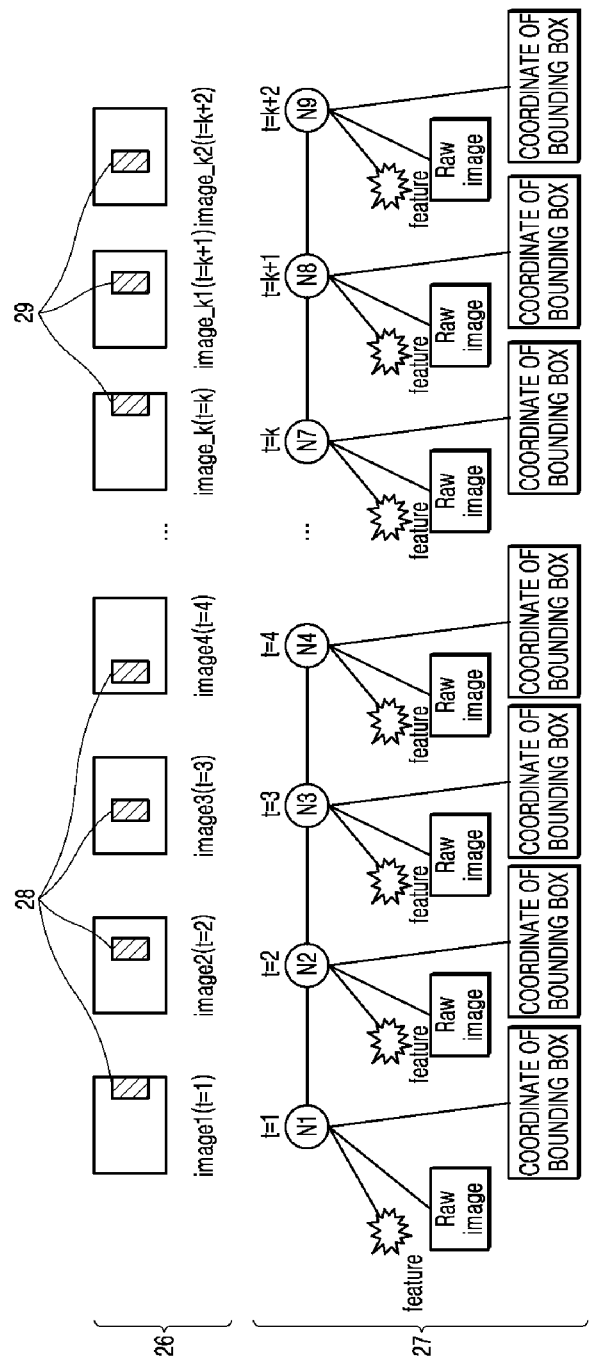
FIG. 7 shows an exemplary process of determining, by a robot, a salient object according to an embodiment.

FIG. 7 shows an exemplary process of determining a salient object by a robot according to an embodiment. FIG. 7 shows a process of verifying, by a controller 250 of a robot, an object commonly included in a first image acquired at a first time point and a second image acquired at a second time point after the first time point as a salient object.

Reference numeral 26 shows four images captured during movement of a robot 100 and salient objects 28 in the corresponding images. During movement of the robot, time t changes from t=1 to t=4. An image obtained at a time point of t=1 is image 1, an image obtained at a time point of t=2 is image 2, an image obtained at a time point of t=3 is image 3, and an image obtained at a time point of t=4 is image 4.

In some examples, reference numeral 26 shows that a position of the salient object 28 has changed in each of the images because a relative position between the salient object and the robot is also changed during movement of the robot 100.

Therefore, the robot 100 determines and stores the object 28 commonly provided in the four images as a salient object.

At this time, a method of storing in the map storage 210 is exemplified in reference numeral 27. Reference numeral 27 is an example of a SLAM pose-graph for each time point. The pose-graph includes nodes N1 to N9 that each correspond to time points and at least one edge between two nodes as shown in reference numeral 27. In the SLAM pose-graph, at least three pieces of information (e.g., feature, raw image, and coordinate of the bounding box) are stored in each of nodes N1 to N4.

In some embodiments, an image acquired at a time point of t=1 stores a raw image and a salient object (e.g., a feature) in the raw image separately. The salient object stored in the map storage 210 may be stored as an image extracted along an outline of the salient object in the raw image.

The coordinates of the bounding box may also be stored in the map storage such that the coordinates show a position of the salient object in the raw image.

In order to store a position of the photographed salient object 28, the map storage 210 stores the salient object, the raw image, and coordinates of the bounding box corresponding to each of the nodes N1 to N4 at each of time points.

At each of the edges between the two nodes of the nodes corresponding to two time points from among the time points (i.e., t=1 to 4), information generated during a movement of the robot from a first time point corresponding to a first node to a second time point corresponding to a second node and obtained by a wheel odometry or other sensors may be stored.

Similarly, the robot 100 may acquire images at different time points (e.g., t=k to t=k+2) in different spaces, extract new salient objects 29 in the same manner as the above-described process, and store the extracted new salient objects 29 in the map storage.

Reference numeral 29 is a newly identified salient object. Similarly, the controller 250 stores, in the map storage 210, the identified position of the salient object and image information. The controller 250 stores, in the map storage 210, the salient objects 29, each of the raw images (e.g., image_k to image_k2), and each of coordinates of bounding boxes showing the positions of the salient objects 29 in each of the raw images.

Information stored as shown in reference numeral 27 in FIG. 7 may be compared with images acquired during movement of the robot 100.

FIG. 7 shows a mapping process. In this process, in the first image (corresponding to t=1 or t=k) where the salient object is identified, the controller 250 determines a salient object or a candidate area in which the salient object may be disposed by object detection. In an embodiment, in this process, "YOLOv3", "Mask R-CNN", and the like may be used to detect the object. When a candidate area where the salient object may be disposed is selected, the controller 250 performs verification on the salient object and selects the salient object to be stored in the map storage 210 from among the candidate areas as shown in FIG. 5.

Alternatively, the interface 290 outputs candidate bounding boxes indicating candidate areas. The administrator may select a box suitable for the salient object from the output boxes.

Alternatively, even if the administrator may not make additional selection, the interface 290 displays the area including the salient object stored in the image using a bounding box such that the administrator of the robot 100 determines a process of generating the map and a process of storing the salient object.

When a plurality of salient objects are identified in the image, as shown in FIG. 5, the controller 250 may select the salient objects based on a position of the salient object in the image, dynamic properties or fixedness of the object itself. In some examples, the controller 250 may store history with respect to the salient object which is selected during previous generation of the map or which is frequently used in the map due to high similarity between the salient object and the object in the image stored in the salient object universe database in the map storage 210 or an additional storage medium. The controller 250 stores, as the salient object, some areas in the image suitable for the salient object.

Alternatively, the interface 290 may recommend more useful salient objects such that an administrator may select a bounding box. In FIG. 6, the bounding box 24 may be displayed in a thicker or clearer line to induce the administrator to select the bounding box 24.

When the salient object is extracted from the first image (e.g., t=1 or t=k), the controller 250 may predict a next position of the salient object through a multiple-object tracking method in subsequent images (e.g., t=2, 3, . . . , or t=k+1, k+2, . . . ). The interface 290 may output the bounding box at the predicted position of the salient object. Alternatively, the controller 250 may automatically store the area of the predicted position as the salient object.

A simple online and real-time tracking (SORT) or person of interest (POI) method may be used as examples of the multi-object tracking method. When the output bounding box is out of the periphery of an actual salient object, the administrator may touch the interface 290 to change the bounding box.

Figure 8:
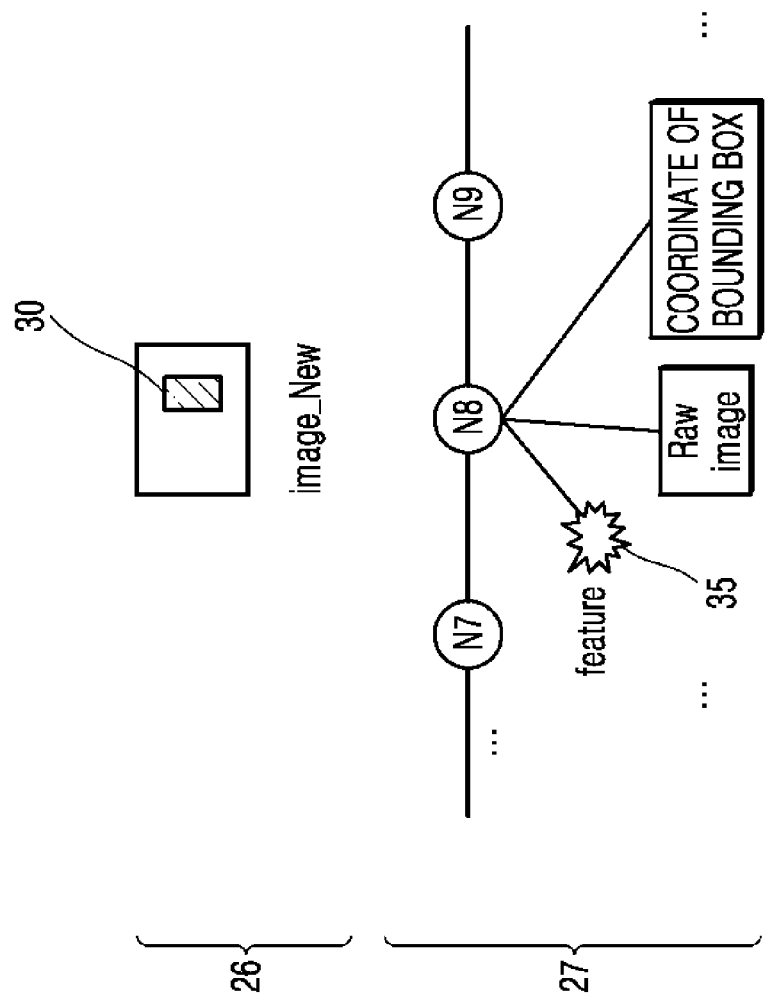
FIG. 8 shows a robot comparing an image captured during movement of the robot with an image stored in a map storage according to an embodiment.

FIG. 8 shows an exemplary comparison of an image acquired during movement of a robot with an image stored in a map storage according to an embodiment. Reference numeral 31 shows a result of extraction of salient objects by acquiring an image by a robot. Reference numeral 32 shows a process of identifying a current position thereof based on comparison with information stored in a map storage.

A robot 100 obtains image_New. The robot 100 classifies the salient object in the acquired image as shown in reference numeral 30. In some examples, the robot 100 may extract position coordinates of the salient object 30 in the image_New.

The robot 100 searches for the extracted salient object 30 in the map storage. As the salient objects are separately stored in FIG. 7, the salient object 30 may be compared with the salient object stored in the map storage 210. Based on a result of the comparison, the robot found that the salient object 35 stored in node N8 is equal to the salient object 30. The robot 100 may extract the coordinates of the bounding box with respect to the found salient object 35.

The robot 100 determines that, based on a result of the comparison of the coordinates of the bounding box corresponding to the node N8 with the position coordinates of the salient object 30 in the image_New, the current position is the node N8 stored in the map storage.

In the process described with reference to FIGS. 7 and 8, the robot 100 may generate a map and may store the salient object, and subsequently, in the SLAM process, the position of the robot with respect to the salient object may be identified.

Figure 9:
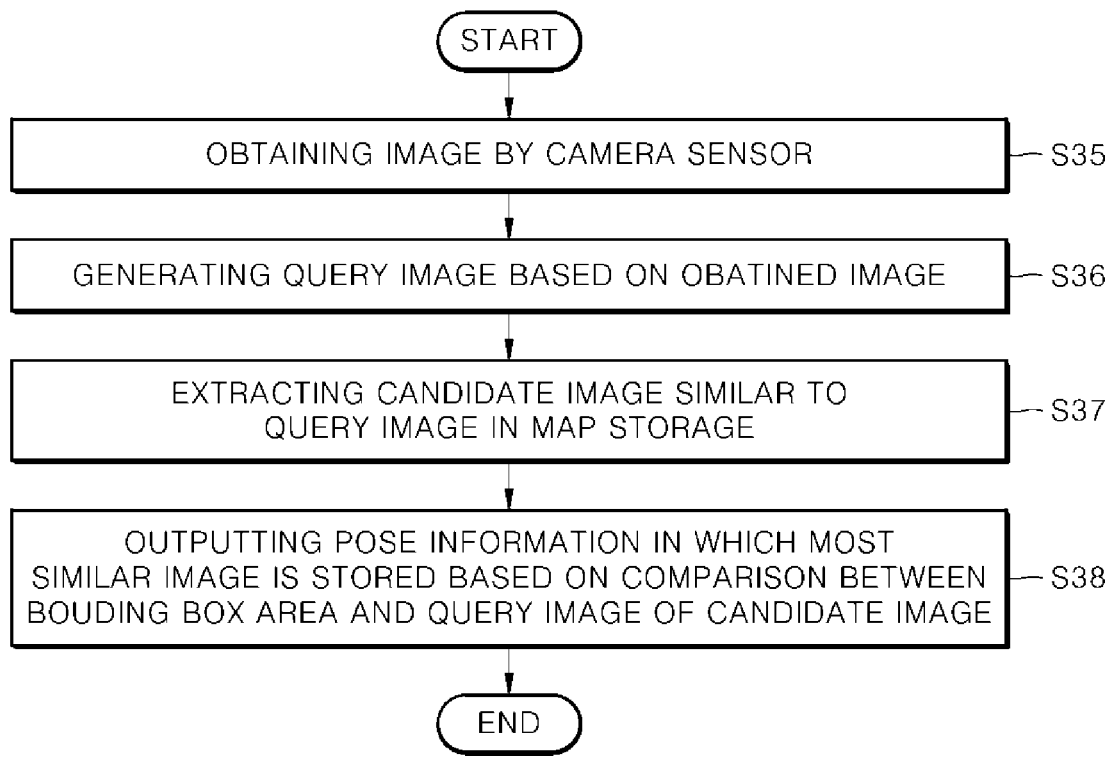
FIG. 9 shows a localization process of generating pose information in a map storage using a salient object according to an embodiment.

FIG. 9 shows a localization process of generating pose information in a map storage using a salient object according to an embodiment.

A camera sensor 230 of a robot 100 obtains an image (S35). A controller 250 generates a query image based on the obtained image (S36). The query image is configured to be compared with images stored in the map storage 210 and refers to a portion of the image obtained by the camera sensor 230. An example of the query image includes an image in which the salient object is extracted from the image obtained by the camera sensor 230.

The controller 250 extracts a candidate image similar to the query image from the map storage 210 (S37). In some embodiments, when the query image is generated, the controller 250 extracts candidate images similar to the query images through a clustering method such as vocabulary tree (VocTree).

The controller 250 compares the query image and the area of the bounding box among the candidate images and generates information on a node corresponding to the image determined to be the most similar (e.g., pose information). The process in FIG. 9 corresponds to a localization process (e.g., location estimation or estimation of location or position of the robot).

When SLAM is performed with respect to the salient objects, the accuracy in the SLAM may be improved by preventing incorrect positioning due to the similarity between images.

Figure 10:
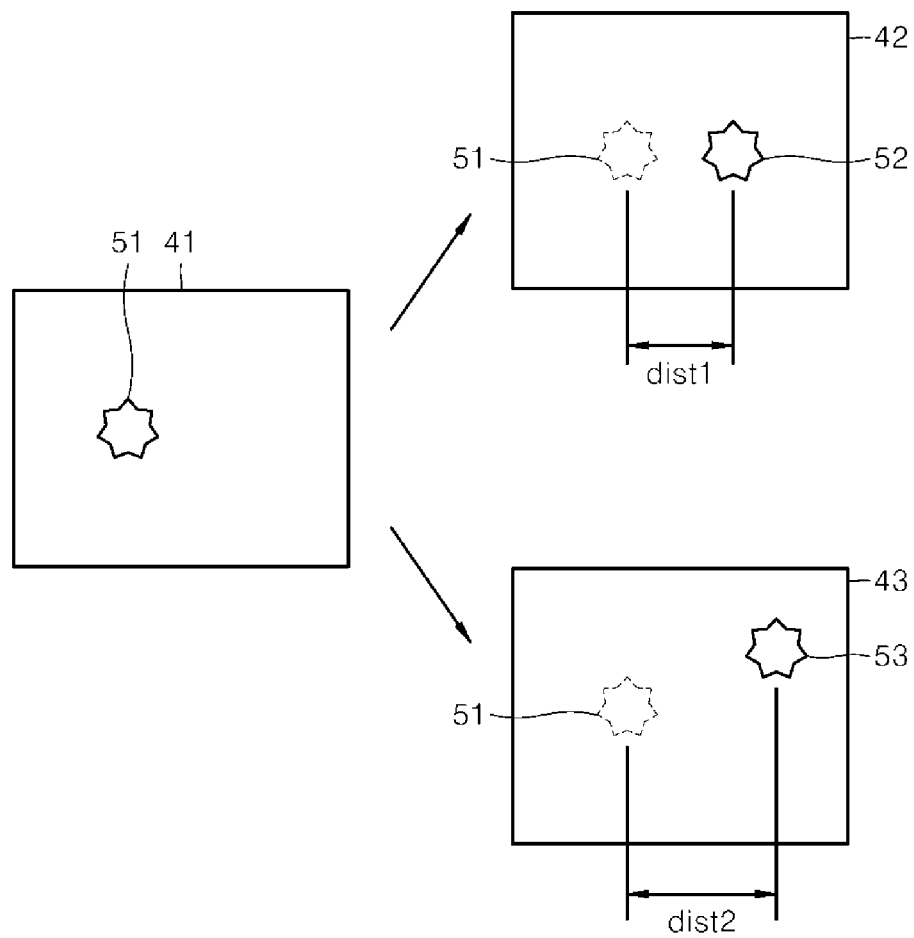
FIG. 10 shows an exemplary process of detecting movement of an object in a continuously captured image and determining a salient object according to an embodiment.

FIG. 10 shows an exemplary process of detecting, by a robot, movement of an object and determining a salient object in a continuously captured image according to an embodiment.

As shown in FIG. 7, a controller 250 moves at a constant speed and captures surrounding images. Therefore, the same object is more likely to be captured in two consecutive images. FIG. 7 shows example tracking the object and storing the object as the salient object.

In some examples, after the objects are detected in two or more consecutive images, the controller 250 may determine whether the objects in the two images are the same object based on the position change between the objects in the two images and a moving distance of the robot.

In FIG. 10, an image 41 photographed at a first time point (i.e., t=1) includes one object 51 (i.e., a first object). A first embodiment of an image photographed at a second time point, i.e., t=2 is an image 42. A position of the first object 51 from the first image 41 is indicated by dotted lines in image 42.

In some examples, an object 52 (i.e., a second object) is moved from the position of the first object 51 by a horizontal distance of "dist1" in the second image 42. The controller 250 determines that the second object 52 in the second image 42 is the same as the first object 51 in the first image 41 based on a similarity between the second object 52 in the second image 42 and the first object 51 in the first image 41 being equal to or greater than a predetermined reference and a changed distance from the first object 51 to the second object 52, i.e., "dist1" corresponding to the moving distance of the robot. The controller 250 verifies whether the two objects 51 and 52 are salient objects. The controller 250 may store the object as a salient object in the map based on the result of verification.

In some examples, the second exemplary embodiment of the image captured at the second time point (i.e., t=2) is reference numeral 43. A position of the first object 51 in the first image 41 is indicated by dotted lines in a third image 43.

In some examples, an object 53 (i.e., a third object) in the third image 43 is moved from the position of the first object 51 by "dist 2" in an inclined direction rather than horizontal direction. A similarity between the third object 53 in the third image 43 and the first object 51 in the first image 41 is equal to or greater than a reference, but distance change amount corresponding to "dist2" may not correspond to the moving distance of the robot or a moving direction of the object may be completely different from the moving direction of the robot.

In this case, the controller 250 determines that the third object 53 in the third image 43 is different from the first object 51 in the first image 41. The controller 250 verifies whether each of the two objects 51 and 53 is a salient object. Based on the result of the verification, the controller 250 may or may not store the corresponding object as the salient object in the map.

As the first image 41 captured at the time point t1 and the third image 43 captured at the time point t2 include different objects (which are likely to be the dynamic objects), the controller 250 may not determine the objects 51 and 53 as the salient objects, respectively.

The above configuration is summarized as follows.

As shown in FIG. 7, when two images (e.g. a first image and a second image) are captured at different capturing time points and positions, an object that is most likely to be selected as a salient object is likely to be included in the two images. In some examples, the positions of the objects in the two images are determined based on a moving distance or a moving direction of the robot.

To this end, the controller 250 detects the first object in the first image and detects the second object in the second image. The controller 250 determines whether the first object and the second object are the same object based on the position change between the first object and the second object and the moving distance of the robot. In the case of the same object, the controller 250 verifies whether the first object and the second object are salient objects and stores the same in the map storage 210.

When the object is verified as the salient object, the controller 250 stores, in the map storage 210, the first object, the first image, the bounding box for the first object, and position information obtained from a first image as a unit. Similarly, the controller 250 stores, in the map storage 210, the second object, the second image, the bounding box for the second object, and the position information obtained from the second image as a unit.

Figure 11:
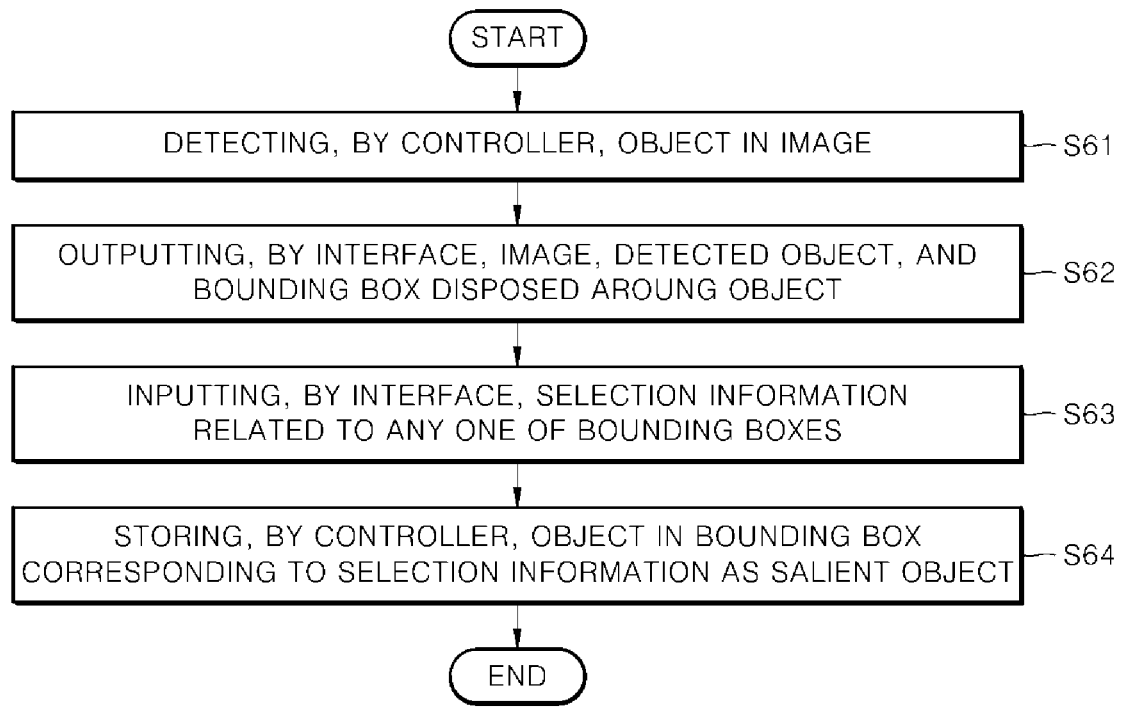
FIG. 11 shows an exemplary process of outputting, by an output interface of a robot, a salient object and receiving selection thereof according to an embodiment.

FIG. 11 shows an exemplary process of outputting, by an interface of a robot, a salient object and receiving selection thereof according to an embodiment. An interface 290 outputs predetermined visual information and audio information. In some examples, the interface 290 includes a touch screen to select the output information or to move displayed information through a dragging motion input such that the interface 290 processes the input information.

The controller 250 detects an object in the image (S61). The controller 250 may calculate the position of the bounding box around the detected object. The interface 290 outputs the detected object and the bounding box arranged around the object (S62).

The interface 290 may output an area where the salient object may be disposed at the current location such that users or administrators modify or determine the area.

In particular, when two or more objects are detected in the image, the interface may output two or more bounding boxes corresponding to the two or more objects, and may receive selection information corresponding to any one of the two or more bounding boxes (S63).

In this case, the selection information includes information on a user's touch of a periphery portion or an inner portion of the bounding box. Alternatively, the selection information includes information in which the user touches or drags the periphery portion or the inner portion of the bounding box to change the position or size of the bounding box.

The controller 250 of the robot stores, as a salient object, the object in the bounding box corresponding to the selection information. In this process, the controller 250 may perform a process of extracting an object based on the changed bounding box when a position or a size of the bounding box is changed.

Figure 12:
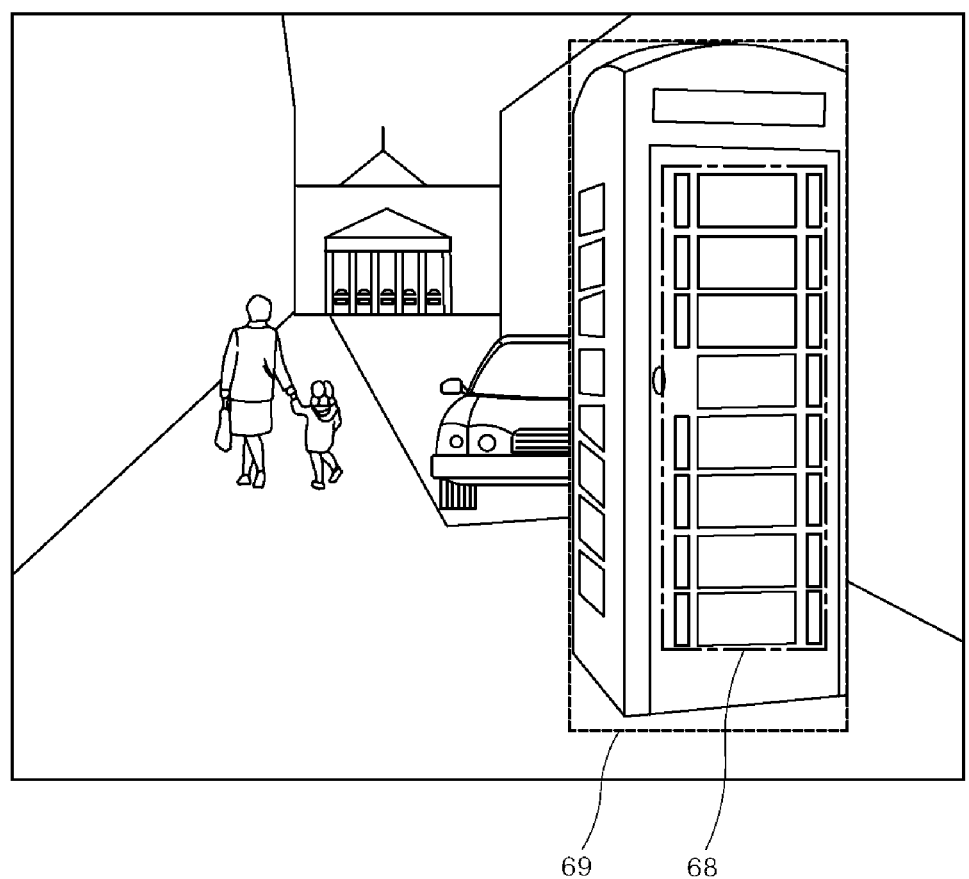
FIG. 12 shows an exemplary result of changing a bounding box according to an embodiment.

FIG. 12 shows an exemplary result of changing a size of a bounding box according to an embodiment. A controller 250 detects a public telephone booth, generates a bounding box having a rectangular shape 68, and an interface 290 outputs a first bounding box 68.

A user or an administrator determines that the first bounding box 68 displayed on the interface 290 includes only a portion of an actual public telephone booth, and drags or resizes the first bounding box 68 to a second bounding box 69.

When the changing process is performed, the controller 250 extracts the salient object with respect to the second bounding box, and subsequently, stores, in the map storage 210, the salient object, the second bounding box, an image (e.g., the image in FIG. 12), and position information related to the robot obtained from the image.

Based on the above-described embodiments, the artificial intelligence processor 255 of the robot 100 or the artificial intelligence processor 355 of the cloud server 300 may classify the input image when the object in the images is extracted, based on determining whether the object is a dynamic object or a fixed object, or based on determining that the object is disposed near the robot or far away from the robot.

Alternatively, the artificial intelligence processor 255 of the robot 100 or the artificial intelligence processor 355 of the cloud server 300 may determine the boundary line of the salient object in the input image and output information about the area of the bounding box. The configuration of the artificial intelligence processor 255 of the robot 100 or the artificial intelligence processor 355 of the cloud server 300 is described in more detail.

Artificial intelligence refers to a field of researching artificial intelligence or researching methodologies for creating artificial intelligence, and machine learning refers to a field of defining various problems in the field of artificial intelligence and researching methodologies for solving the problems. The machine learning is defined as an algorithm that improves the performance of a task through consistent experiences with the task.

An artificial neural network (ANN) is a model used in machine learning and may refer to any kind of model having a problem-solving capability, the model including artificial neurons (nodes) forming a network by a combination of synapses. The ANN may be defined by a connection pattern between neurons in different layers, a learning process for updating model parameters, and an activation function for generating an output value.

The ANN may include an input layer and an output layer. Optionally, the ANN may further include one or more hidden layers. Each layer may include one or more neurons, and the ANN may include synapses for connecting the neurons. In the ANN, each neuron may output function values of the activation function associated with input signals, weights, and deflections that are received through the synapses.

The model parameters refer to parameters determined through learning and include synapse connection weights, neuron deflections, and the like. In some examples, hyper-parameters refer to parameters to be set before learning in a machine learning algorithm and includes a learning rate, the number of repetitions, a minimum placement size, an initialization function, and the like.

The training purpose of the ANN may be regarded as determining model parameters to minimize a loss function. The loss function may be used as an index for determining an optimal model parameter during the learning process of the ANN.

The machine learning may be classified as supervised learning, unsupervised learning, or reinforcement learning depending on the learning scheme.

The supervised learning may refer to a method of training the ANN while a label for learning data is given, and the label may refer to an answer (or a result value) to be inferred by the ANN when the learning data is input to the ANN. The unsupervised learning may refer to a method of training the ANN while the label for the learning data is not given. The reinforcement learning may refer to a learning method for training an agent defined in any embodiment to select an action or a sequence of actions that maximizes cumulative reward in each state.

Machine learning implemented using a deep neural network (DNN) including a plurality of hidden layers in the ANN is called deep learning, and the deep learning is a portion of the machine learning. In the following description, the machine learning is used as a meaning including the deep learning.

For the robot 100, the artificial intelligence processor 255, which is a sub-component of the controller 250 that has been described above, may perform an artificial intelligence function. The artificial intelligence processor 255 of the controller 250 may be implemented with software or hardware.

Figure 13:
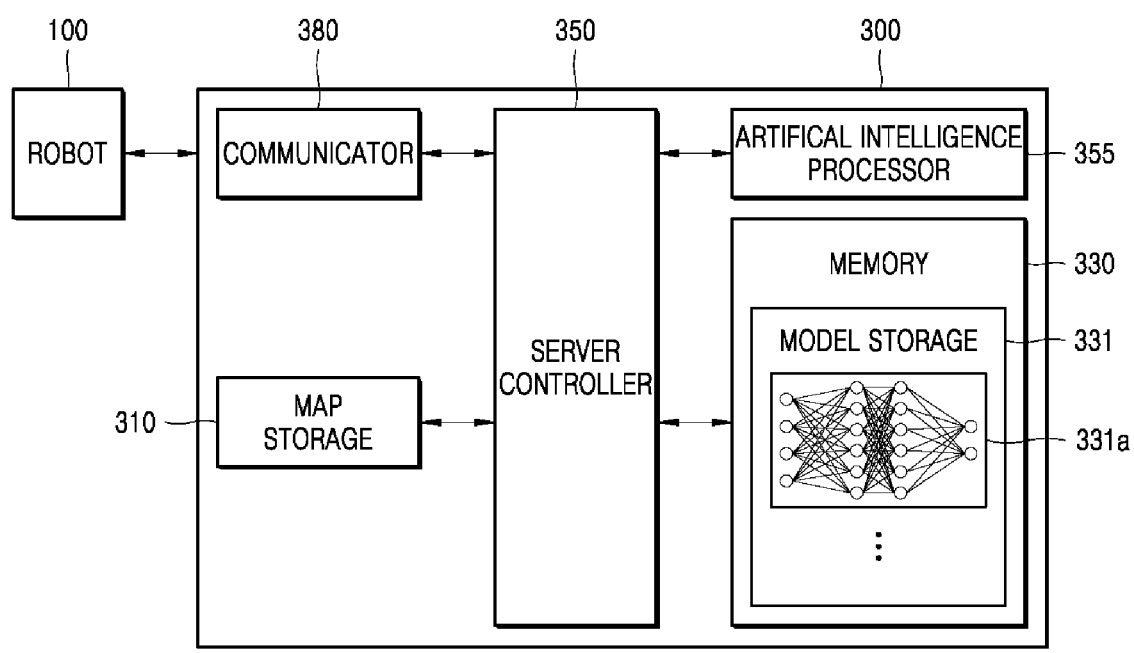
FIG. 13 shows an exemplary configuration of a cloud server according to an embodiment.

In this case, the communicator 280 of the robot 100 may transmit or receive data to or from external apparatuses such as the cloud server 300, which is described in FIG. 13, or a robot for providing another artificial intelligence function through wired and wireless communication technologies. For example, the communicator 280 may transmit or receive sensor information, user inputs, learning models, controls signals, and the like to or from external apparatuses.

In this case, the communication technology used by the communicator 280 includes global system for mobile communication (GSM), code-division multiple access (CDMA), long term evolution (LTE), 5G, Wireless LAN (WLAN), Wireless-Fidelity (Wi-Fi), Bluetooth, radio-frequency identification (RFID), infrared data association (IrDA), ZigBee, near field communication (NFC), and the like.

The interface 290 may acquire various kinds of data.

In this case, the interface 290 may include a camera that receives an image signal input, a microphone that receives an audio signal, a user input that receives information from a user, and the like. Information acquired by the LiDAR sensor 220, the camera sensor 230, or the microphone refers to sensing data, sensor information, and the like.

The interface 290, various types of sensors, the wheel encoder 260, and the like may acquire input data or the like to be used when an output is acquired using a learning model and learning data for learning a model. The aforementioned components may acquire raw input data. In this case, the controller 250 or the artificial intelligence processor 255 may extract an input feature as a preprocessing process for the input data.

The artificial intelligence processor 255 may train a model including an ANN using learning data. The trained ANN may correspond to a learning model. The learning model may be used to infer a result value not for the learning data but for new input data, and the inferred value may be used as a determination basis for the robot 100 to perform a certain operation.

In this case, the artificial intelligence processor 255 of the robot 100 may perform artificial intelligence processing along with the artificial intelligence 355 of the cloud server 300.

In this case, the artificial intelligence processor 255 of the robot 100 may include a memory integrated or implemented within the robot 100. Alternatively, the artificial intelligence processor 255 of the robot 100 may be implemented with an additional memory, an external memory coupled to the robot 100, or a memory of an external apparatus.

The robot 100 may acquire at least one of internal information related to the robot 100, environmental information related to the robot 100, and user information using various types of sensors.

A memory built in the robot 100 may store data to support various types of functions of the robot 100. For example, the memory may store input data, learning data, a learning model, a learning history, and the like which are acquired by the interface 290 or various types of sensors built in the robot 100.

The controller 250 may determine at least one executable operation of the robot 100 based on information determined or generated using a data analysis algorithm or a machine learning algorithm. In some examples, the controller 250 may control components of the robot 100 to perform the determined operation.

To this end, the controller 250 may request, retrieve, receive, or utilize data of the artificial intelligence or the memory and may control the components of the robot 100 to execute a predicted operation or an operation determined as being desirable among the at least one executable operation.

In this case, when there is a need for connection to an external apparatus in order to perform the determined operation, the controller 250 may generate a control signal for controlling the external apparatus and transmit the generated control signal to the external apparatus.

The controller 250 may acquire intention information with respect to a user input and may determine user's requirements based on the acquired intention information.

In some examples, the controller 250 may extract a feature point from sensor data acquired in real time, such as image sensor data or LiDAR sensor data. To this end, the artificial intelligence processor 255, i.e., more specifically, the FEM submodule may include an ANN that is trained according to the machine learning algorithm. In some examples, the artificial intelligence processor 255 of the robot 100 is trained, but trained by the artificial intelligence processor 355 of the cloud server 300 or through distributed processing therebetween.

The controller 250 may collect history information including operations of the robot 100, user feedback regarding the operations, and the like and may store the history information in the memory or the artificial intelligence processor 255 or transmit the history information to an external apparatus such as the cloud server 300. The collected history information may be used to update the learning model.

FIG. 13 shows another exemplary configuration of a cloud server according to an embodiment.

A cloud server 300 that performs a function of an artificial intelligence server, i.e., an AI server may refer to an apparatus that trains an ANN using a machine learning algorithm or an apparatus that uses a trained ANN. The cloud server 300 may include a plurality of servers to perform distributed processing and may be defined as a 5G network.

The cloud server 300 includes a communicator 380, a server controller 350, an artificial intelligence processor 355, and the like, each of which is the same as described above with reference to FIG. 3. In some examples, the cloud server 300 may further include a memory 330.

The memory 330 may include a model storage 331. The model storage 331 may store a model (or an artificial intelligence network 331a) that is already trained or being trained by the artificial intelligence processor 355.

The artificial intelligence processor 355 may train the artificial intelligence network 331a based on learning data. The learning model may be used while being provided in the cloud server 300 of the artificial intelligence network or while provided in an external apparatus such as the robot 100.

The learning model may be implemented with hardware, software, or a combination thereof. When some or all of the learning model is implemented with software, one or more instructions to form the learning model may be stored in the memory 330.

The server controller 350 may infer a result value for new input data using the learning model and may generate a response or a control command based on the inferred result value.

Although components included in the exemplary embodiment of the present disclosure are described as being combined to one, or as being coupled to operate, such exemplary embodiment is not necessarily limited to this specific example, and these components may be selectively combined to one or more and coupled to operate within the purpose range of the present disclosure. Further, although all of the components may be implemented as an independent hardware, a part or all of each of the components may be selectively combined and implemented as a computer program that has a program module to perform a part or all of the functions combined in one or a lot of hardware. Codes and code segments that are included in the computer program may be easily deduced by those skilled in the art of the present disclosure. The computer program may be stored in computer readable media that a computer may read, and may be read and implemented by the computer, so as to implement the present disclosure. The storage medium of the computer program may include a storage medium including a semiconductor recording element, an optical recording medium, a magnetic recording medium. Further, the computer program that implements the embodiment of the present disclosure may include a program that is transmitted in real time through an external apparatus.

While the present disclosure has been mainly described referring to the exemplary embodiments of the present disclosure hereinabove, various modifications and changes can be made at the level of those skilled in the art. Therefore, unless such modifications and changes do not deviate from the range of the present disclosure, it will understand that they are included in the scope of the present disclosure.

Other embodiments are within the scope of the following claims.

What is claimed is:

1. A robot comprising:
a motor configured to cause the robot to move within a space;
a camera sensor configured to capture one or more images for the robot to perform simultaneous localization and mapping (SLAM) with respect to a salient object for estimating a location of the robot within the space;
a non-transitory map storage configured to store information for the robot to perform the SLAM; and
a controller configured to:
detect an object from the one or more captured images;
select, as a specific salient object for identifying the space, the detected object verified as corresponding to the specific salient object; and
store, in the map storage, the selected specific salient object and coordinate information related to the selected specific salient object, wherein the coordinate information includes information on a position and a size of a bounding box around the selected specific salient object, and wherein the controller is further configured to predict a next position of the selected specific salient object using multiple-object tracking in subsequent images when the selected specific salient object is extracted from a first image among the one or more captured images.

2. The robot of claim 1, wherein the controller is further configured to input a specific object from the one or more captured images as a search query for performing a position estimation of the robot, wherein the specific object is inputted based at least in part on the stored selected specific salient object from the map storage.

3. The robot of claim 1, wherein the object is selected based at least in part on the detected object being determined as a fixed object.

4. The robot of claim 3, wherein the controller is further configured to determine a distance between the object from the robot, and to determine a similarity of the detected object with respect to the selected specific salient object based on an arrangement sequence of one or more objects by comparing the detected object and a particular object stored in a database or a previously selected salient object, wherein the detected object is selected based at least in part on the detected object being determined as the fixed object and a respective distance of the detected object being determined to be less than a predefined threshold.

5. The robot of claim 3, wherein the controller is further configured to determine a similarity based on a comparison between the detected object and a particular object stored in a database or a previously selected salient object, and to compare the detected object and the selected specific salient object based at least in part on the determined similarity.

6. The robot of claim 1, wherein the detected object is verified as corresponding to the specific salient object based at least in part on an object being included in both a first image obtained at a first time point and a second image obtained at a second time point subsequent to the first time point.

7. The robot of claim 6, wherein the detected object is verified as corresponding to the specific salient object based at least in part on a position change of the object between respective positions of the object in the first image and the second image, and a moving distance of the robot.

8. The robot of claim 1,
wherein the robot further comprises an interface to output information, and
wherein the controller is further configured to cause an output, through the interface, of the one or more captured images, the detected object, and the bounding box disposed around the detected object after the object is detected from the one or more captured images.

9. The robot of claim 8,
wherein two or more objects are detected from the one or more captured images,
wherein the controller is further configured to:
cause, through the interface, an output of two or more bounding boxes corresponding to the detected two or more objects,
to obtain selection information related to one of the two or more bounding boxes, and
store objects in the selected bounding box as the salient object.

10. A cloud server,
configured to receive, from a robot, one or more images for the robot to perform simultaneous localization and mapping (SLAM) with respect to a salient object for estimating a location of the robot within a space, comprising:
a non-transitory map storage configured to store information for the robot to perform the SLAM; and
a server controller configured to:
detect an object from the received one or more images;
select, as a specific salient object for identifying the space, a detected object verified as corresponding to the specific salient object;
store, in the map storage, the selected specific salient object and coordinate information related to the selected specific salient object, wherein the coordinate information includes information on a position and a size of a bounding box around the selected specific salient object; and
predict a next position of the selected specific salient object using multiple-object tracking in subsequent images when the selected specific salient object is extracted from a first image among the received one or more images.

11. The cloud server of claim 10, wherein the server controller is further configured to input a specific object from the received image as a search query for performing a position estimation of the robot, wherein the specific object is inputted based at least in part on the stored selected specific salient object from the map storage.

12. The cloud server of claim 10, wherein the detected object is selected based at least in part on the detected object being determined as a fixed object.

13. The cloud server of claim 12, wherein the server controller is further configured to determine a distance between the detected object from the robot, and to determine a similarity of the detected object with respect to the selected specific salient object based on an arrangement sequence of one or more objects by comparing the detected object and a particular object stored in a database or a previously selected salient object, wherein the detected object are selected based at least in part on one or more detected objects being determined as the fixed object and a respective distance of the one or more detected objects being determined to be less than a predefined threshold.

14. The cloud server of claim 10, wherein the detected object is verified as corresponding to the specific salient object based at least in part on an object being included in both a first image obtained at a first time point and a second image obtained at a second time point subsequent to the first time point.

15. A method comprising:
   causing a robot to move within a space;
   capturing, by a camera sensor of the robot, one or more images for performing a simultaneous localization and mapping (SLAM) with respect to a salient object for estimating a location of the robot within the space;
   detecting an object from the one or more captured images;
   selecting, as a specific salient object for identifying the space, a detected object verified as corresponding to the specific salient object;
   storing the selected specific salient object and coordinate information related to the selected specific salient object, wherein the coordinate information includes information on a position and a size of a bounding box around the selected specific salient object; and
   predicting a next position of the selected specific salient object using multiple-object tracking in subsequent images when the selected specific salient object is extracted from a first image among the one or more captured images.

16. The method of claim 15, wherein the detected object is selected based at least in part on the detected object being determined as a fixed object.

17. The method of claim 15, further comprising:
   determining a distance between the detected object from the robot, and
   determining a similarity of the detected object with respect to the selected specific salient object based on an arrangement sequence of one or more objects by comparing the detected object and a particular object stored in a database or a previously selected salient object, wherein the detected object is selected based at least in part on the detected object being determined as a fixed object and a respective distance of the detected object being determined to be less than a predefined threshold.

18. The method of claim 15, wherein the detected object is verified as corresponding to the specific salient object based at least in part on an object being included in a first image obtained at a first time point and a second image obtained at a second time point subsequent to the first time point.

19. The method of claim 15, further comprising outputting, after detecting the object from the one or more captured images, the one or more captured images, the detected object, and the bounding box disposed around the detected object.

* * * * *